Figure 1A:
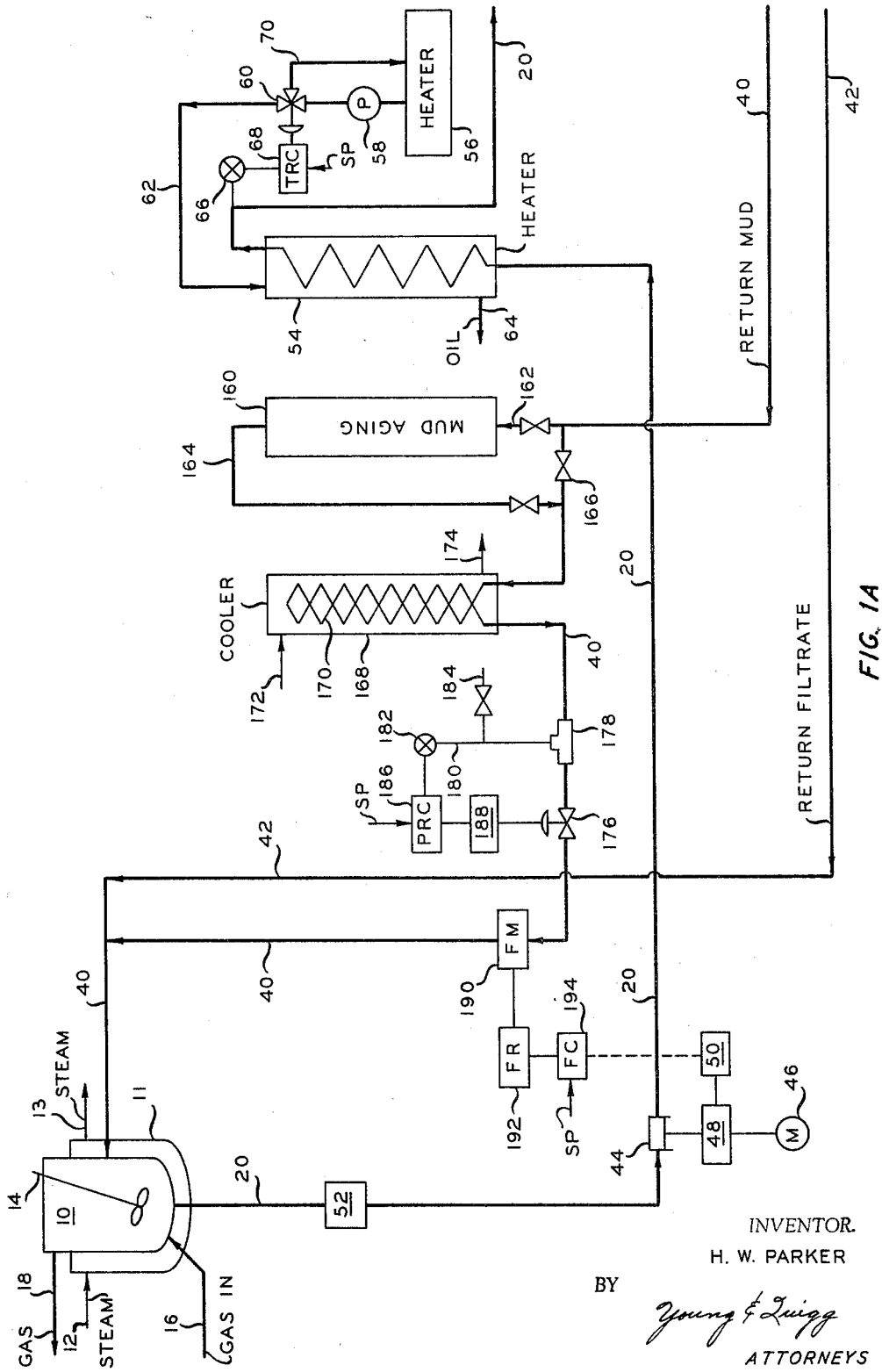

Nov. 22, 1966  H. W. PARKER  3,286,510
DRILLING MUD TEST APPARATUS AND PROCESS
Filed May 18, 1964  3 Sheets-Sheet 1

INVENTOR.
H. W. PARKER
BY
Young & Quigg
ATTORNEYS

INVENTOR.
H. W. PARKER
BY
Young & Quigg
ATTORNEYS

United States Patent Office 3,286,510
Patented Nov. 22, 1966

3,286,510
DRILLING MUD TEST APPARATUS AND PROCESS
Harry W. Parker, Bartlesville, Okla., assignor to Phillips Petroleum Company, a corporation of Delaware
Filed May 18, 1964, Ser. No. 368,256
16 Claims. (Cl. 73—53)

This invention relates to a process and apparatus for determining drilling mud characteristics. A specific aspect of the invention is concerned with a high temperature and high pressure drilling mud test apparatus and process.

In order to develop improved drilling mud compositions utilizing improved drilling mud additives and to improve drilling operations, the properties of drilling muds should be measured and studied under conditions existing at the bottom of the bore hole where pressures may be up to 20,000 p.s.i. and temperatures may be up to 450° F. and even higher.

This invention provides a process and apparatus which permits the measurement and study of drilling mud properties at elevated temperatures and pressures in a circulating mud system. Apparatus has been built in accordance with the invention disclosed herein designed for pressures up to 10,000 p.s.i. operating at mud temperatures up to 450° F.

Accordingly, it is an object of the invention to provide an apparatus and process for high temperature and high pressure testing of aqueous drilling muds to determining mud properties. Another object is to provide automatic controls for the circulation of drilling mud thru test apparatus. Another object is to provide an apparatus and process for determining the viscosity of hot drilling mud at elevated pressure while maintaining the drilling mud in heated condition. A further object is to provide an apparatus and process for determining water-loss rate of aqueous drilling mud at elevated temperature and pressure and to control the flow rate of filtrate and pressure differential across the filtrate during operation. It is also an object of the invention to provide an apparatus and process for automatically measuring the flow rate of filtrate from a mud filtering apparatus and process. Another object is to provide an improved filtering apparatus and process for determining the water-loss rate of aqueous drilling mud. Other objects of the invention will become apparent to one skilled in the art upon consideration of the accompanying disclosure.

One embodiment of the invention comprises pumping a stream of mud from a mud reservoir at about atmospheric pressure to a selected pressure in the range of about 100 to 20,000 p.s.i. thru a high pressure circuit which returns to the reservoir thru a backpressure valve reducing the pressure substantially to atmospheric; heating the mud in the high pressure circuit to a selected temperature in the range of about 300 to 500° F.; passing the stream of hot mud in said circuit thru a restricted flow zone to determine the pressure differential across the flow zone as a measure of viscosity; heating the flow zone so as to maintain the selected mud temperature therein; passing the stream of hot mud in said circuit thru a filtering zone wherein the mud flows over and along the surface of the filter at a pressure differential across the filter to cause filtrate to flow out of the filtering zone; measuring the rate of flow of filtrate from the filtering zone as a water-loss characteristic of the mud; and cooling the mud stream returning to the reservoir to below its atmospheric boiling temperature. Another embodiment of the invention comprises apparatus for performing the foregoing process embodiment of the invention including a mud reservoir; a filtering device connected by a feed line from the mud reservoir and a return line to the mud reservoir; a pump in the feed line for raising the mud pressure to the required range; a heater in the feed line downstream of the pump for raising the temperature of the mud to the desired level; a viscometer in the feed line downstream of the heater having means for heating same; a cooler in the return line for cooling the mud to a temperature below its atmospheric boiling point; and a backpressure valve in the return line downstream of the cooler for reducing the pressure to atmospheric pressure.

Figure 1B:
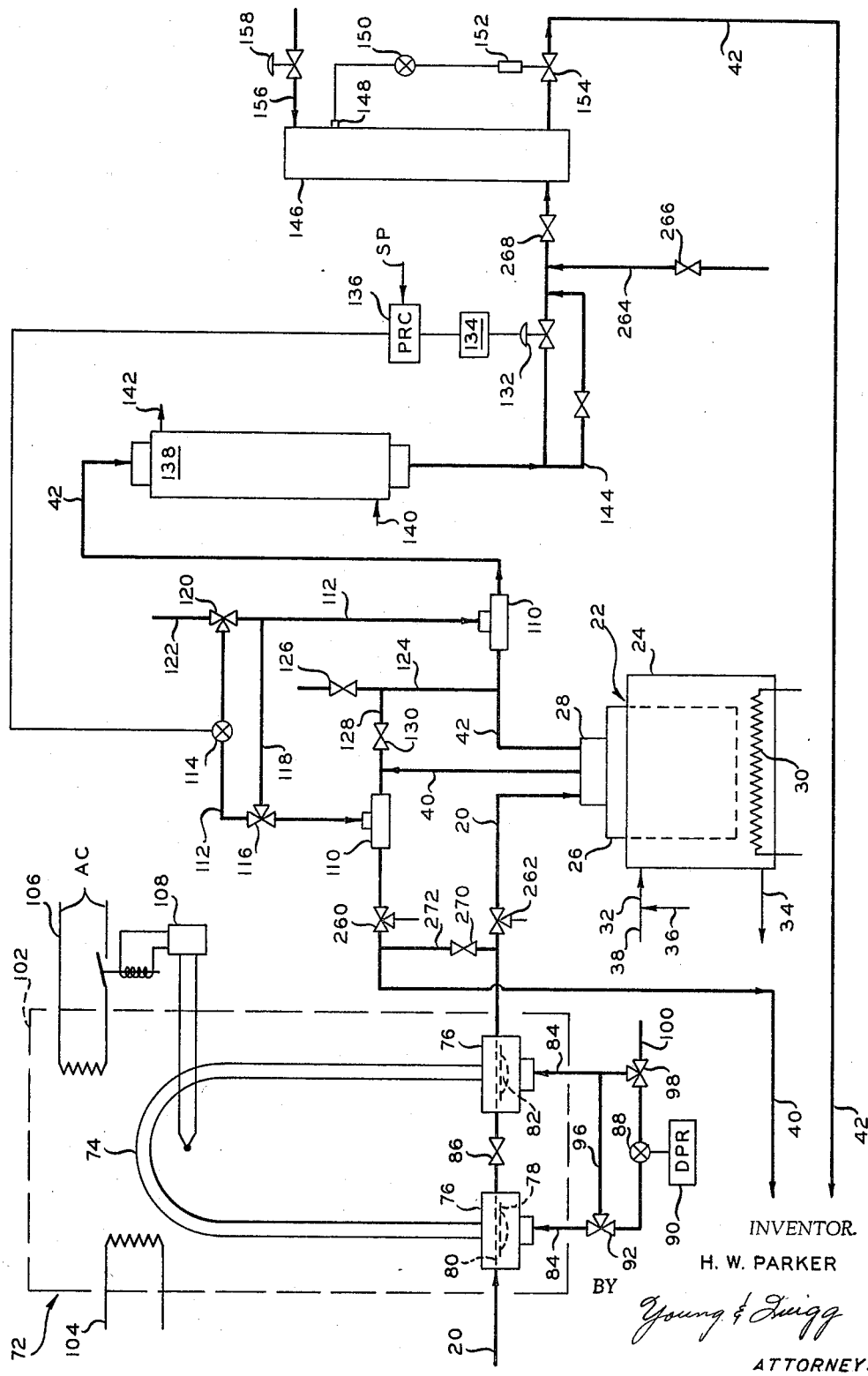
Figure 2:
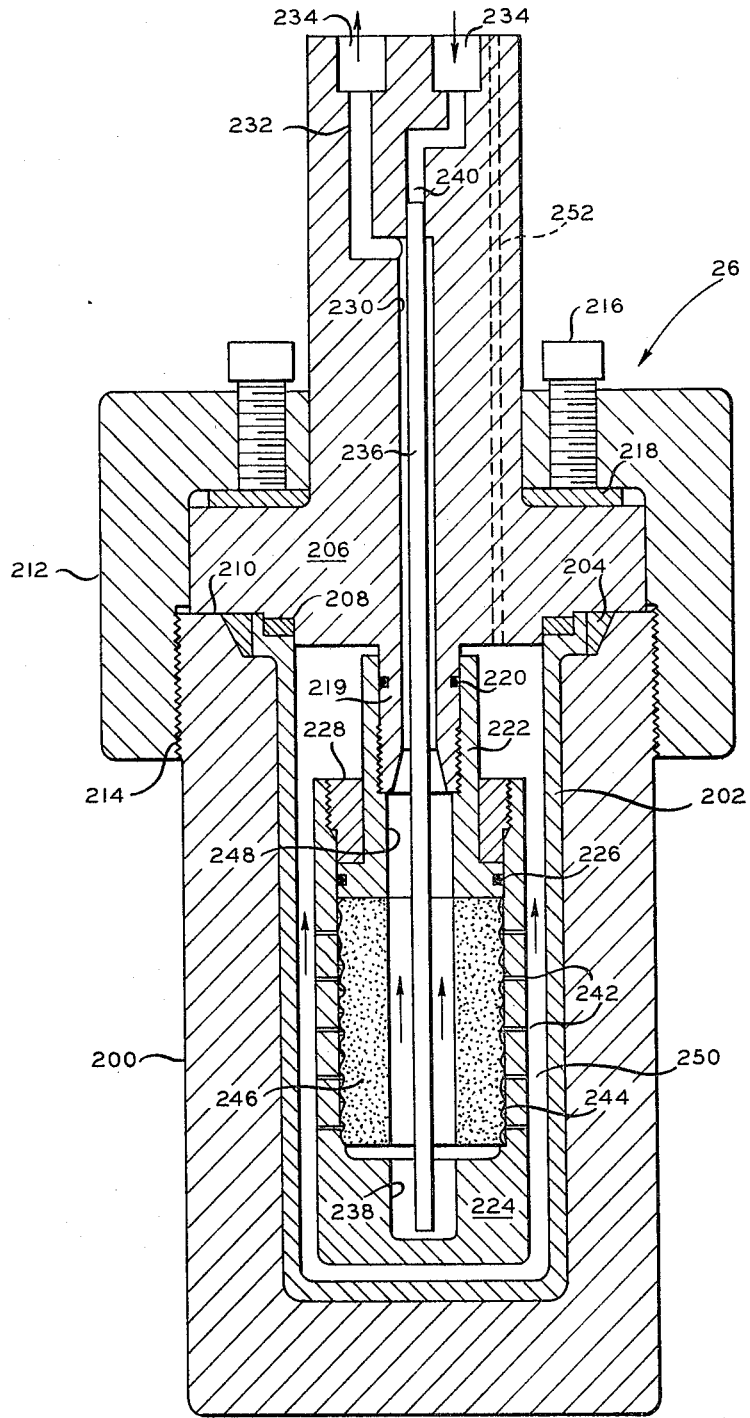

Various other embodiments of the invention will be more clearly understood by reference to the accompanying schematic drawing of which FIGURE 1 is a flow showing a preferred arrangement of apparatus in accordance with the invention; and FIGURE 2 is an elevation in partial section of a filtering device adapted for use in the arrangement of FIGURE 1.

Referring to FIGURE 1 a mud reservoir 10 is provided with a steam jacket 11 including steam inlet 12 and a steam outlet 13, a stirrer 14 operated by an electric motor (not shown) to maintain a homogeneous mud, a gas inlet 16 and a gas outlet 18 for circulating gas thru the mud to simulate exposure of the mud to air in field operation. Mud reservoir 10 is connected by a mud feed line 20 to dynamic water-loss apparatus 22 which comprises a heating jacket 24, a filter 26, a filter cover 28, and electric heating coil 30 connected with a suitable current source (not shown). Heating jacket 24 is also provided with an inlet line 32 and an outlet line 34 for ingress and egress of cooling fluid which may comprise air introduced through line 36 or a liquid coolant such as water introduced thru line 38. Water-loss device 22 is connected with reservoir 10 by mud return line 40. Filter device 22 is also connected with mud reservoir 10 thru filtrate line 42.

A high pressure pump 44 is positioned in line 20 near reservoir 10 for the purpose of raising the pressure of the mud in this line to the selected level. Pump 44 is operated by motor 46 thru a gear box 48 having a variable speed pneumatic actuating device 50. This complete unit of pump, motor, gear box, and controller is available commercially and needs no further description. A Monel strainer 52 provided with a 100 mesh screen is positioned in line 20 upstream of pump 44.

A heater 54 is positioned in line 20 downstream of pump 44 and is connected with a heating means comprising an oil heater 56, a pump 58, and a 3-way valve 60 in a feed line 62 leading to the heater. Oil outlet line 64 conveys oil back to the heater. The control of heating in heater 54 is effected by means of a temperature transmitter 66 sensitive to the temperature in line 20 just downstream of the heater which transmits a signal to temperature recorder controller 68 proportional to the sensed temperature. Instrument 68 is in control of motor valve 60 so that when the sensed temperature rises above the selected level, valve 60, which is a 3-way valve, is turned to pass the hot oil back to the heater thru line 70. This arrangement of the heating means provides automatic control of the outlet temperature of the mud from heater 54.

A viscometer 72 is positioned in line 20 downstream of heater 54. This device comprises a capillary (inverted) U-tube 74 connected at its ends with line 20 thru pressure taps 76. These pressure taps used throughout the system are provided with a diaphragm 78 one side of which is exposed to the mud flowing thru channel 80, the other side of the diaphragm being exposed to water or other suitable liquid in recess or cavity 82 which communicates with the opposite pressure tap by means of conduit 84. A cutoff valve 86 is provided in line 20 intermediate pressure tap 76. A differential pressure transmitter 88 is positioned in conduit 84 and emits a signal to differential pressure recorder 90 indicating the differential pressure across tubing 74 when valve 86 is closed. A 3-way valve 92 in one branch of conduit 84 has one of its ports connected with conduit 96 leading to the other branch of conduit 84.

This arrangement provides for equalizing the pressure in each branch of conduit 84 on opposite sides of transmitter 88. Another 3-day valve 98 is positioned in the other branch of conduit 84 and has one port connected with fill line 100. This arrangement permits filling conduits 84 and 96 with water or other suitable liquid for transmitting pressure to transmitter 88 from diaphragms 78 and 82. The system is filled with water and the pressure equalized before starting the mud test. The pressure taps 76 avoid filling the pressure sensitive system with mud which would set and interfere with the determination of pressure differential.

Tube 74 is enclosed in insulated housing 102 and the device is heated to prevent reduction of mud temperature during testing by means of a primary heater 104 which supplies most of the heat required for maintaining the desired temperature of tube 74. A secondary heater 106 is provided to supply the balance of heating required and is automatically controlled by a thermistor actuated on-off temperature controller 108. This unit with the control is commercially available and needs no further discussion as to structure. However the thermistor senses the temperature within housing 102 and controls the heat input of heater 106. Thus, when operating at a mud temperature of 450° F., when the thermistor senses a temperature below 450° F. the heat input of heater 106 is increased and when a higher temperature is sensed, the heat input of heater 106 is decreased to compensate for the tendency to overheat.

The hot mud from filter 22 returns thru line 40 to the reservoir and the hot filtrate passes thru line 42 in a return circuit to the mud return line just upstream of the mud reservoir 10. The pressure differential across the filter in device 22 is effected in a manner similar to the measure of differential pressure across the ends of U-tube 74 in the viscometer. A pair of pressure taps 110 are positioned in lines 40 and 42 adjacent filter 26. These pressure taps are of the same construction as filter taps 76 previously discussed. A pressure circuit comprising conduit 112 communicates with the diaphragms in the pressure taps. Each branch of line 112 communicates with a differential pressure transmitter 114. A 3-way valve 116 in the left branch communicates with conduit 118 bypassing transmitter 114. A second 3-way valve 120 connects line 122 with the pressure circuit for the purpose of filling the circuit and bypass line 118 with a suitable liquid such as water. After the circuit is filled with water, and the pressure in the two branches of the circuit is equalized, valve 116 is open to flow from its respective pressure tap 110 to transmitter 114 and valve 120 is likewise open to flow of pressure sensitive liquid from its respective pressure tap 110 to the other side of transmitter 114 and closed to line 122. Line 124 containing valve 126 and line 128 containing valve 130 are connected with the filtrate line 42 and with mud return line 40, respectively, to permit equalization of pressure in these lines at start up after which both valves are closed.

A motor valve 132 is positioned in filtrate line 42 downstream of pressure cap 110 and is operated by a transducer 134 which receives an electrical signal from pressure recorder controller 136 proportional to the differential pressure across lines 40 and 42 sensed by transmitter 114 which sends the proportional signal to instrument 136. Instrument 136 has a set point control calibrated in pounds per square inch. Transducer 124 converts the electrical signal received from instrument 136 into a pneumatic signal which is fed to the diaphragm of motor valve 132 to provide the required flow for maintaining the set pressure differential on pressure recorder controller 136. In operating the high pressure mud system at a pressure of about 10,000 pounds per square inch, the pressure differential across the mud and filtrate lines as sensed by transmitter 114 is maintained at a selected level in the range of 1000 to 5000 p.s.i.

The filtrate in line 42 is at a temperature close to the high pressure mud temperature in line 40 and is cooled in a cooler 138 positioned in line 42 intermediate pressure tap 110 and motor valve 132. A suitable coolant is passed into cooler 138 thru line 140 and withdrawn thru line 142 under control, not shown, to maintain a suitable filtrate temperature such as about 100° F. Valved line 144 is provided to permit bypassing of motor valve 132 during start up of the system.

A burette or other graduated tube 146 is positioned in line 42 downstream of motor valve 132 to measure the volume of filtrate flowing thru this line per unit of time. An electrode 148 at a selected level in the upper end of burette 146 actuates a sensitive relay 150 when the water rises to the level of the electrode and relay 150 transmits an electrical signal to a solenoid 152 which operates motor valve 154 to open same for allowing passage of the measured volume of filtrate thru line 42 downstream of the motor valve. In order to effect rapid evacuation of burette 146 after filling has taken place, a relatively constant superatmospheric gas pressure is maintained in burette 146 by gas from pressuring line 156 connecting with a suitable pressuring system such as the plant air line (not shown). Valve 158 is an automatic pressure regulator valve which maintains a constant pressure in line 56 downstream thereof and in burette 146. In one application of the invention this pressure regulator maintains a pressure of 15 p.s.i.g. on the liquid in burette 146.

A mud aging tank 160 is connected with mud return line 40 by valved conduits 162 and 164. By closing valve 166 and opening the valves in the connecting conduits 162 and 164, mud flows into tank 160 for aging at elevated temperature. When it is desired to bypass tank 160, the valves are again manipulated to pass the mud thru valve 166 with valves in lines 162 and 164 closed.

In order to cool the mud before returning same to the mud reservoir, a cooling tank 168 is positioned in line 40 downstream of mud aging tank 160. The mud passes thru coil 170 which is contacted with a circulating stream of coolant introduced thru line 172 and withdrawn thru line 174. The heat exchange in cooler 168 is controlled so as to reduce the temperature of the mud to below the boiling point thereof at atmospheric pressure.

A backpressure motor valve 176 is positioned in line 40 downstream of cooler 168. A pressure tap 178 is positioned intermediate motor valve 176 and tank 168 and is of the same construction as the previously described pressure taps. Line 180 communicates pressure transmitter 182 with the diaphragm in pressure tap 178, line 180 being filled with water or other pressure sensitive liquid thru line 184. A pressure recorder controller 186 receives a signal from pressure transmitter 182 and feeds a signal to transducer 188 proportional to the sensed pressure and manipulates valve 176 to provide the selected pressure in line 40 upstream of valve 176. In one embodiment of the invention, instrument 182 is an electrical transmitter, instrument 186 is an electrical pressure recorder controller and instrument 188 is a transducer which converts the electrical impulse received into a pneumatic signal which operates the diaphragm of motor valve 176.

The pumping rate effected by pump 44 is automatically controlled at a selected level in the range of 1 to 15 gallons of mud per hour. A flow sensing device such as flow meter 190 is positioned in mud return line 40 downstream of motor valve 176 and senses the flow rate in the return mud line, emitting a signal proportional thereto which is received by flow recorder 192. Flow recorder 192 transmits a signal to flow controller 194 which has a set point in gallons of mud per hour and is calibrated in the range of 0 to 15 gallons of mud per hour. This instrument emits a demand signal to variable controller 50 on gear box 48 which regulates the speed of pump 44 so as to meet the demand flow rate thru meter 190.

In one embodiment of the invention, instrument 190 is a magnetic flow meter which emits an electrical impulse to a Dynotrol instrument 192 which converts the electrical signal to a corresponding pneumatic signal and feeds the pneumatic signal to instrument 194. The latter instrument has a set point of 2 gallons per hour, for example. Instrument 194 then emits a pneumatic demand signal to controller 50 which changes the velocity or speed of pump 44 thru the gear box arrangement (when required) which provides the set flow rate of instrument 194.

Referring to FIGURE 2 the device shown is identified by numeral 26 in FIGURE 1 and omits the jacket 24 surrounding same. Filter 26 comprises a thick-walled mud vessel 200 capable of withstanding high pressure of at least 10,000 p.s.i. and is lined with a Monel liner 202 attached thereto by weld 204. A heavy Monel cover 206 closes the top of the vessel and rests on a heavy duty gasket 208 in the form of a sealing ring. Cover 206 has an extending annular shoulder 210 which functions in applying pressure on the cover to hold same sealed on ring 208 against pressures up to at least 10,000 p.s.i. Retaining head 212 is threaded on the vessel 200 by threads designated 214. In assemblying the filter, the retaining head is threaded onto the vessel reasonably snug and the pressure seal is effected by turning long socket bolts 216 against hardened steel pressure ring 218 so as to force cover 206 tightly against seal ring 208. In a vessel constructed in accordance with FIGURE 2, 12¾" long socket head nickel chrome bolts (216 in FIGURE 2) were utilized for holding the pressure on cover 206.

Cover 206 is machined with a depending protuberance 219 threaded on the lower end and machined for seal ring 220. The filter head attached to protuberance 219 comprises a top closure member 222 sealably engaging the inner wall of filter head body 224 by means of O-ring 226. A collar 228 threads into filter head member 224 so as to retain closure member 222 in sealed position as shown. An axial passageway 230 extends thru cover 206 into the interior of the filter head from a point below the top of the cover and connects with an L-shaped conduit 232 leading to a high pressure connection fitting 234. An axial tube or pipe 236 of smaller external diameter than the internal diameter of passageway 230 extends from a level above the upper terminus of passageway 230 thru the filter head into a recess 238 drilled in the bottom of filter head body 224. The upper end of pipe 236 connects with passageway 240 leading into another high pressure connection fitting 234.

The filter head body 224 is provided with radial passageways 242 disposed in vertical and circular rows around the body. The inner wall of 224 is lined with a Monel screen 244 of 100–300 mesh. A sand core 246 in the form of an annulus is formed in situ by placing a mandrel in member 224 having a diameter substantially that of throat 248 which is the same as the diameter of recess 238 so that the mandrel extends into this recess and packing sand of suitable particle size around the mandrel and then consolidating the sand with water glass or other suitable binder which does not interfere with the permeability of the core. Thereafter, the mandrel is withdrawn to leave an annular passageway between pipe 236 and the consolidated sand core. The arrangement thus far described provides a passageway for mud into the filter head along the inner wall of the sand core and out of the filter head either thru pipe 236 or passageway 230. The filtrate passes thru the sand core, the screen, and thru openings 242 into the annulus 250 surrounding the filter head and is withdrawn therefrom thru a conduit 252 extending thru cover 206 to a suitable connection therein (not shown). All of the parts or elements of filter 26 which are exposed to the mud are constructed of Monel so that the filter is adapted to testing salt-containing muds.

The heating in jacket 24 enclosing filter device 26 is controlled similarly to the heating in jacket 102 of viscometer 72 with separate circuits, although a single circuit is diagrammatically illustrated in FIGURE 1.

Viscometer 72, in addition to testing the viscosity in the manner heretofore described, is also useful in determining gelling characteristics of the hot mud being circulated in line 20. The gelation characteristics of a mud are determined by opening valve 86 in line 20 so that the mud in tube 74 is static. After a selected setting period such as 10 minutes to one hour, valve 86 is closed and the maximum differential pressure on instrument 90 is read during the dislodging of the static mud from tube 74 as an indication of gelling characteristics. By using different time periods succesively in this testing technique, the gelling tendencies of the mud being tested are readily explored.

During start up of the testing procedure, lines downstream of valves 260 and 262 are filled with water introduced thru line 264 by opening valve 266 with valves 260 and 262 closed, the latter valves being 3-way valves which have vent ports. Injection of water thru line 264 into line 42 with valve 268 closed forces water thru the filtrate system upstream of line 264 and thru filter 26 and mud lines 20 and 40 up to valves 260 and 262. During this start up procedure valve 270 in bypass line 272 is opened so that the hot mud bypasses filter 26 and returns to the reservoir until the system is ready for operation, at which time, valves 266 and 270 are closed, valve 268 is opened and valves 260 and 262 are opened to allow mud to flow thru the water-loss device 22 including filter 26.

The apparatus shown in the drawing and described herein has been constructed and assembled. The high pressure lines have been constructed of 5/16" conduit having an external diameter of 9/16" so as to minimize the internal pressure exerted on the conduits at 10,000 p.s.i. mud pressure and all of the equipment used in the high pressure circuit was specifically constructed to withstand at least 10,000 p.s.i. pressure. The capacity of the high pressure mud circuit was maintained at 1.2 gallons of mud so that the equipment requires only small individual batches of mud for testing. The apparatus was constructed of Monel to permit the testing of salt water muds. The instrumentation provides unattended operation.

Valves 92, 98, 116 and 120 are called three-way valves in the foregoing disclosure, but they are a special form of three-way valves designated in the trade as three-way (cross) type valves. This type of valve always allows passage of fluid thru two of the ports therein and opens and closes the third port. To illustrate, valve 92 always is open to flow thru line 84 but may be either closed or open to flow from or to line 96.

Certain modifications of the invention will become apparent to those skilled in the art and the illustrative details disclosed are not to be construed as imposing unnecessary limitations on the invention.

I claim:
1. A drilling mud testing apparatus comprising in combination:
 (a) a mud reservoir having a mud inlet and a mud outlet;
 (b) filtering means for determining rate of water loss from said mud having a mud inlet, a mud outlet, and a filtrate outlet;
 (c) conduit means connecting the mud outlet of the reservoir of (a) with the mud inlet of the filtering means of (b);
 (d) a high pressure pump in the conduit means of (c) for supplying high pressure mud to the filtering means of (b);
 (e) a heater in the conduit means of (c) downstream of the pump of (d) for heating the mud flowing thru the conduit means of (c);
 (f) a viscometer in the conduit means of (c) downstream of the heater of (e), having heating means therein;

(g) return conduit means connecting the mud outlet of the filtering means of (b) with the mud inlet of the reservoir of (a);

(h) a cooler in the conduit means of (g) for cooling mud returning to the mud reservoir of (a) thru the conduit means of (g);

(i) a backpressure valve in the conduit means of (g) for holding the mud pressure upstream thereof and reducing the pressure downstream thereof;

(j) means connected with the filtrate outlet of the filtering means of (b) for determining the filtrate flow rate from said outlet; and (k) means for controlling the pressure output of the pump of (d).

2. The apparatus of claim 1 including a high pressure mud aging vessel having an inlet connected with an upstream point in the return conduit means of (g) and an outlet connected with a downstream point thereof upstream of the cooler of (h) and the valve of (i), and valve means for controlling the flow of mud into said vessel.

3. The apparatus of claim 1 wherein the viscometer of (f) comprises:
   (1) a U-tube of small bore connected at its ends with the conduit means of (c) thru a pair of pressure taps each containing a diaphragm sensitive to mud pressure at its respective end of said tube;
   (2) a line connecting the diaphragm sides of the pressure taps of (1) so that a liquid in said line is pressure responsive to mud pressure in said taps;
   (3) a differential pressure transducer in the line of (2); and
   (4) a differential pressure recorder responsive to the transducer of (3).

4. The apparatus of claim 1 wherein the filtering means (b) comprises:
   (1) a mud vessel having a pressure sealed cover;
   (2) a filter head in the vessel of (1) suspended from the cover thereof comprising a hollow porous cylinder formed of filter material and forming an annulus with the wall of said vessel for filtrate;
   (3) an axial mud passageway thru said cover communicating with the interior of the cylinder of (2);
   (4) a mud pipe extending axially thru the cover of (1) and thru the cylinder of (2) forming a mud annulus with the walls of the passageway of (3) and with the inner wall of said cylinder; and
   (5) a conduit in the cover of (1) communicating with the annulus for filtrate of (2) for withdrawal of filtrate from the vessel of (1).

5. In the apparatus of claim 1 wherein the backpressure valve of (i) is a motor valve, means for controlling the pressure of mud in the return conduit means of (g) comprising in combination:
   (1) a pressure transmitter sensitive to the pressure in the conduit means of (g) upstream of the backpressure valve of (i) adapted to emit a signal proportional to the sensed pressure; and
   (2) a pressure controller responsive to the transmitter of (1) in actuating control of said backpressure valve.

6. In the apparatus of claim 1 wherein the pump of (d) is operated by an electric motor thru a gear box having a speed controller thereon, means for controlling the flow rate of mud in the return conduit means of (g) comprising in combination:
   (1) a flow meter in said return conduit adapted to sense the flow rate therein and emit a signal proportional to the sensed flow;
   (2) a flow rate recorder sensitive to the emitted signal from the flow meter of (1) and emit a signal proportional thereto;
   (3) a flow controller sensitive to the signal from the recorder of (2) in actuating control of the speed controller on said gear box.

7. The apparatus of claim 6 wherein the flow meter of (1) is a magnetic flow meter which emits an electrical impulse, the flow rate recorder includes a transducer which converts the electrical signal received to a proportional pneumatic signal, the flow controller of (3) is pneumatic and has a set point on a scale reading volume of mud per unit of time, and the speed controller on said motor is pneumatically controlled.

8. A dynamic mud filter for determining water loss from a drilling mud comprising:
   (a) a mud vessel having a pressure sealed detachable cover;
   (b) a filter head sealably supported from the cover and axially disposed in the vessel of (a) to form an annulus for filtrate with the wall of said vessel, said filter head comprising a hollow cylinder having radial passageways therethru, a fine annular screen lining the inner wall of said cylinder, and an annulus of filtering sand adjacent said screen coaxial with said cylinder forming an axial mud chamber in said filter head;
   (c) an axial mud passageway thru the cover of (a) communicating with the axial mud chamber in the filter head of (b);
   (d) an axial mud pipe extending loosely thru the mud passageway of (c) to the lower end of the mud chamber in the filter head of (b) so as to define a flow annulus between said pipe and the wall of said passageway; and
   (e) a filtrate outlet from the filtrate annulus of (b) thru the cover of (a).

9. The filter of claim 8 wherein the filter head of (b) is provided with a closure member threaded to the cover of (a) against a seal ring thereon, the other end of said closure member forming a seal with the inner wall of the hollow cylinder of (b) by means of a seal ring therebetween, said closure member being retained in sealed relation to said hollow cylinder by a collar threaded into the upper end thereof against a shoulder on said closure member.

10. The filter of claim 8 wherein the filtrate outlet of (e) is connected by a conduit with the bottom section of an upright burette for measuring the volume of filtrate flowing from the filter in a selected period of time.

11. The apparatus of claim 10 wherein said burette is pressure sealed and including a valved effluent line leading from the bottom section of said burette and a line connecting the top section of said burette with a relatively constant low pressure gas supply for maintaining a constant backpressure on the filtrate in said burette so that the filtrate flows therefrom when the valve in said valved line is opened.

12. The apparatus of claim 8 including:
   (f) a mud effluent line connecting with one of the axial mud passageways of (c) and the axial mud pipe of (d);
   (g) a filtrate effluent line connecting with the filtrate outlet of (e);
   (h) a pressure tap in each of the lines of (f) and (g) having a diaphragm sensitive to fluid pressure in said lines and conduit connections adjacent the side of said diaphragm remote from the fluid in its respective line;
   (i) a conduit connecting the conduit connections of the pressure taps of (h);
   (j) a differential pressure transmitter in the conduit of (i) sensitive to pressures in the filtrate line of (g) and the mud line of (f);
   (k) a motor valve in the filtrate line downstreams of the pressure tap therein; and
   (l) a pressure controller sensitive to the transmitter of (j) in actuating control of the motor valve of (k), said pressure controller having a set point covering a substantial range of differential pressure.

13. A process for measuring viscosity and water-loss characteristics of a drilling mud which comprises the steps of:
- (1) pumping a stream of mud from a mud reservoir at about atmospheric pressure to a selected pressure in the range of 100 to 20,000 p.s.i. thru a high pressure circuit returning to said reservoir thru a backpressure valve adjacent said reservoir;
- (2) heating the mud in said high pressure circuit to a selected temperature in the range of about 300 to 500° F.;
- (3) passing the stream of hot mud in said high pressure circuit thru a restricted flow zone and determining the pressure differential across said flow zone;
- (4) heating said flow zone so as to maintain substantially the selected mud temperature therein;
- (5) passing the stream of hot mud in said high pressure circuit thru a filtering zone wherein the mud flows along the surface of the filter and filtrate flows thru out of said filtering zone;
- (6) measuring the rate of flow of said filtrate as a water-loss characteristic of said mud; and
- (7) cooling the mud stream returning to said reservoir to below its atmospheric boiling temperature.

14. In the process of claim 13, controlling the flow rate thru the backpressure valve of step (1) by sensing the pressure in said high pressure circuit upstream of said valve and regulating the position thereof to maintain said selected pressure.

15. In the process of claim 13, controlling the pumping rate of step (1) by sensing the return flow rate of mud to said reservoir and regulating the speed of said pump in response to the sensed rate so as to maintain a substantially constant mud return rate.

16. A process for determining the water-loss characteristics of an aqueous drilling mud which comprises the steps of:
- (1) flowing said mud along one surface of a filter while maintaining a relatively high mud pressure and a relatively low pressure on the other surface of said filter so as to cause a stream of aqueous filtrate to flow thru said filter and a high pressure stream of effluent mud to flow away from said filter;
- (2) controlling the pressure differential across said filter and flow of filtrate by sensing the mud pressure and the pressure in the filtrate stream and regulating the flow rate of filtrate to maintain a selected differential pressure;
- (3) passing the filtrate stream into the lower portion of an upright burette to measure the volume thereof;
- (4) maintaining a substantially constant superatmospheric gas pressure in said burette substantially below the filtrate pressure; and
- (5) when filtrate has reached a selected volume level in said burette, opening the outlet of said burette to flow so that filtrate is expelled therefrom by said gas pressure.

References Cited by the Examiner

UNITED STATES PATENTS

| | | | |
|---|---|---|---|
| 2,099,502 | 11/1937 | Stockdale | 210—433 X |
| 2,563,548 | 8/1951 | Plante | 210—444 |
| 3,024,643 | 3/1962 | Jones | 73—55 |
| 3,133,132 | 5/1964 | Loeb et al. | |

RICHARD C. QUEISSER, *Primary Examiner.*

J. W. MYRACLE, *Assistant Examiner.*